United States Patent
Binnig et al.

(10) Patent No.: US 7,057,746 B2
(45) Date of Patent: Jun. 6, 2006

(54) SCANNER FOR PRECISE MOVEMENT AND LOW POWER CONSUMPTION

(75) Inventors: Gerd K. Binnig, Wollerau (CH); Walter Häberle, Waedenswil (CH); Peter Vettiger, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 09/952,773

(22) Filed: Sep. 14, 2001

(65) Prior Publication Data

US 2002/0048057 A1    Apr. 25, 2002

(30) Foreign Application Priority Data

Oct. 20, 2000   (EP)   ................... 00122842

(51) Int. Cl.
*H04N 1/40*   (2006.01)
(52) U.S. Cl. .................... 358/1.12; 358/488
(58) Field of Classification Search .............. 358/1.12, 358/2.1, 498, 488, 468, 496; 355/407, 97
See application file for complete search history.

(56) References Cited

U.S. PATENT DOCUMENTS

| 4,313,659 | A | | 2/1982 | Saito et al. |
| 4,814,622 | A | | 3/1989 | Gregory et al. |
| 5,909,078 | A | | 6/1999 | Wood et al. |
| 6,003,358 | A | * | 12/1999 | Lipari et al. ................... 72/404 |
| 6,040,643 | A | | 3/2000 | Bruns |

* cited by examiner

*Primary Examiner*—Thomas D. Lee
*Assistant Examiner*—Stephen Brinich
(74) *Attorney, Agent, or Firm*—Robert B. Martin; Dillon & Yudell LLP

(57) ABSTRACT

An apparatus and method for moving a first object relative to a second object is provided. One of the first and second objects is moved and thereby guided by a tracking device. The tracking device uses a pattern on the first object and/or second object and a releasable clamping device for holding the first and second object in contact. The first and second object can then be releasably clamped such that the patterns match and the clamping device holds the first and second object in a position defined by the pattern. This invention is particularly well suited for nanomechanical or micromechanical applications.

14 Claims, 1 Drawing Sheet

SCANNER FOR PRECISE MOVEMENT AND LOW POWER CONSUMPTION

BACKGROUND OF THE INVENTION

1. Technical Field

The present invention is related to an apparatus and method for moving a first object relative to a second object and holding them in a defined position. In particular, the present invention relates to a scanning system for micromechanical devices.

2. Description of the Prior Art

When an object is to be moved or driven with a defined precision, then a device that controls the object's position and movement is employed. Such a device is a scanner that includes an actuator, whereby various kinds of driving principles are known for those actuators. Well known are electromagnetic, electrostatic, superconducting, piezoelectric, ultrasonic, pneumatic, air-based, thermal expansion, bimetal, and shape-memory alloy actuators. Micro-actuators and the micro machines driven by them are expected to have wide varieties of applications in information technologies, in medical, bioengineering, optics, and robotics fields. For example, electromagnetic actuators are ubiquitous. They can be found in everything from a large train to the smallest time piece. However, even the smallest magnetic actuators are usually made with wound coils and magnetic materials.

In the European patent application publication no. EP 0 998 019 A1, currently owned by the present applicant, a magnetic scanning or positioning system with at least two degrees of freedom is described. The magnetic scanning or positioning system comprises a supporting base equipped with magnets, a movable platform equipped with at least two electrical coils, and suspension elements providing an elastic connection between the movable platform and the supporting base. The electrical coils are positioned flat on the movable platform, thereby forming an essentially flat arrangement with the movable platform. The scanning or positioning with at least two degrees of freedom can be used in the field of scanning probe microscopy or in the field of data storage or imaging.

Another example is known as an electrostatic actuator. European patent application publication no. EP 0 865 151 A2 describes such an electrostatic actuator. The electrostatic actuator comprises a first member and a second member. The first member has a first opposed surface that includes an array of driven electrodes with pitch and the second member has a second opposed surface including an array of drive electrodes. A support positions the first member adjacent the second member with the first opposed surface spaced apart from the second opposed surface by a spacing. The ratio of the spacing and the pitch should be less than eight, and is preferably less than 2.25. The support permits the first member to move relative to the second member, or vice versa. A voltage source establishes a spatially substantially alternating voltage pattern on the array of driven electrodes. An electrode control establishes a substantially alternating voltage pattern on the array of drive electrode, and selectively imposes a local disruption on the substantially alternating voltage pattern on the array of drive electrodes to move the movable one of the first member and the second member relative to the other.

European patent EP 0 071 066 B1, granted to the present applicant, discloses an electric traveling support. The traveling support comprises a piezoelectric plate resting on three legs whose bottom surface is insulated from the bench on which the support is to travel, by a dielectric. The piezoelectric plate can be caused to contract by means of an actuating voltage applied via sliders to top and bottom electrodes on the plate. By applying a voltage to the legs, these may be clamped selectively by electrostatic forces effective across the dielectric. Appropriate control of the actuating and clamping voltages causes the support to either move in a linear or rotary fashion.

All the aforementioned actuators and scanners need energy not only for movement but also for holding and positioning. Low power precise positioning of parts and devices become more and more important as (nano)micromechanics gains in importance. In particular in nano-mechanics on the bases of local probes where tips have to be positioned with nano-meter precision reliable scanners are missing. For piezo-scanners domain wall creep and for electromagnetic scanners thermal creep are unsolved problems. Additionally, present scanners consume energy for holding and restoring the last position. Furthermore for conventional scanners the energy needed for moving from position to position increases with increasing spring deformation.

It is therefore an object of the present invention to overcome the disadvantages of the prior art.

It is another object of the present invention to provide a scanner with integrated tracking and nearly zero power consumption for holding a position with high precision.

SUMMARY OF THE INVENTION

In order to achieve the objectives of the present invention, a scanning apparatus for moving a first object relative to a second object comprises moving means for driving one of the first and second objects. It further comprises tracking means comprising a pattern on the first object and/or second object and releasable clamping means for holding the first and second object in a position defined by the pattern.

A method for moving the first object relative to the second object is also provided. For that, one of the first and second objects is moved and thereby guided by tracking means. The tracking means comprises a pattern on the first object and/or second object and releasable clamping means for holding the first and second object in contact. The first and second object can then be releasably clamped such that the patterns match and clamping means hold the first and second object in a position defined by the pattern. This invention is particularly well suited for nanomechanical or micromechanical applications but is not restricted to them.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PRESENT INVENTION

In the following, the various exemplary embodiments of the invention are described. Although the present invention is applicable in a broad variety of mechanical applications, it is described with respect to nano and micromechanical applications. Before the various embodiments of the present invention are described, some basic material with respect to the present invention is addressed.

Summing up of small deviations in step sizes for stepwise x-scanning may lead to undefined positions, and for x-y-scanning to undesired rotations of a scanning apparatus. The rotation can be avoided by a micromechanical spring system that is soft for translation and stiff for rotation. A pattern substitutes the springs. The lateral motion is stepwise within the well defined pattern like on a chess board. This can be achieved by mechanical, electrostatic, or magnetic lateral trapping. Having two patterns with the same orientation and periodicity, e.g. parallel lines, on both sides, e.g. on a lever and the counterpart, lateral forces will occur additionally when clamping forces are applied. The lateral forces will drive the scanning apparatus in a defined position like in a stepper motor. The apparatus can therefore be viewed as a 2D-linear nano-stepper motor. Electrostatic clamping might be most reliable and easiest to implement.

Figure 1:
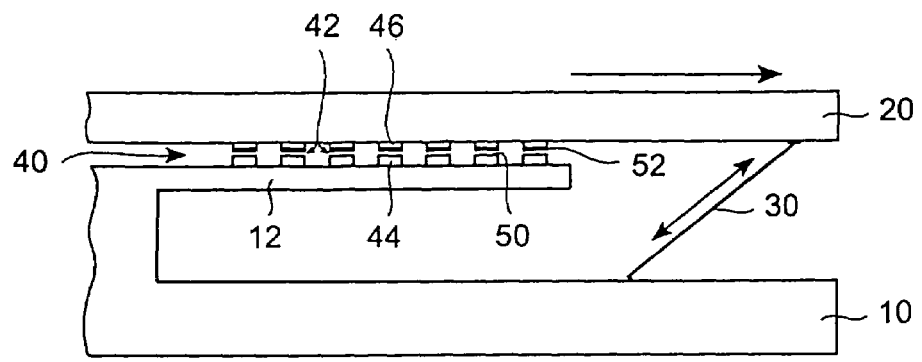
FIG. 1 is a schematic illustration of a first embodiment of a scanner constructed in accordance with the present invention.

FIG. 1 shows a schematic illustration of a first embodiment of a scanning apparatus. The scanning apparatus comprises a first object 10 that is shown in part, as indicated by the wave line on the left side. From this first object 10 extends a lever 12 on which a tracking means 40 is arranged. This tracking means 40 comprises a pattern 42 of periodic first conducting lines 44 which extend from the surface of the lever 12. On top of the first object 10 a second object 20 is arranged that also is shown in part, as indicated by the wave line on the left side. This second object 20 comprises also the tracking means 40 with the pattern 42 and includes second conducting lines 46 which are coated with an insulator 52. The first conducting lines 44, the second lines 46, and the insulator 52 form here a releasable clamping means 50 in form of a capacitor-like arrangement. For the sake of clarity, contacts are not shown in the figure.

The first or second object 10, 20 might be a storage substrate, part of a microscope, or any other device. The second object 20 further comprises a moving means 30 that here is a cantilever 30. The cantilever 30 comprises integrated thermal or piezoelectric functionality resulting in a change of length of the cantilever 30 for contraction and expansion. By arranging the cantilever 30 diagonal between the first and second objects 10, 20 a relative movement between the first and second objects 10, 20 is achieved when the cantilever 30 is activated. This is indicated by the arrows. Several cantilevers 30 might be employed for the movement. Clamping between the first and second object 10, 20 is here performed by the electrostatic means, i.e. the releasable clamping means 50. The mechanical contact between the first and second object 10, 20 is switched periodically from clamping or sticking to non-sticking and vice versa.

There is at least one scanning apparatus for each moving direction, but for better performance there might be two or even several of them operating in a sequence. If the first and second object 10, 20 are clamped no further energy is necessary to feed. In this position some actions can be performed without any scanning. For example, information can be written or read in case of a storage device.

The clamping can also be performed by thermal gluing to a polymer film (not shown). For this integrated heaters for gluing and ungluing are used. In other words, the polymer film is arranged on the first object 10 and several clamping cantilevers with integrated thermal functionality are arranged on the second object 20 or vice versa. This will be shown with reference to FIG. 2.

Figure 2:
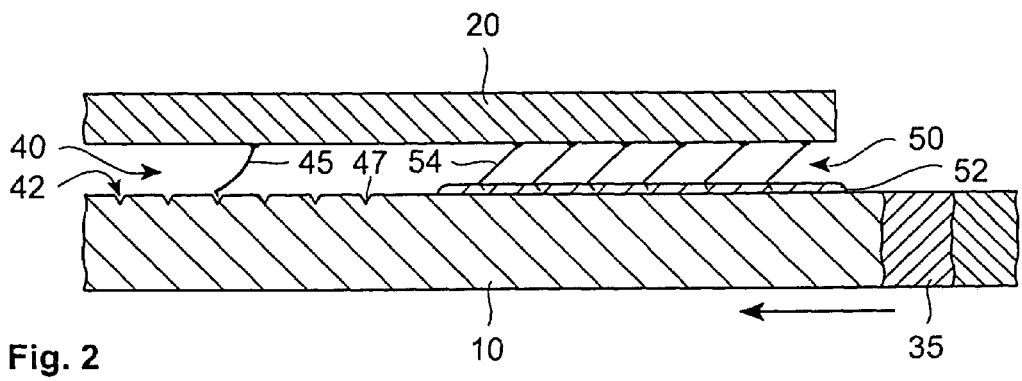
FIG. 2 is a sectional view of a second embodiment of a scanner constructed in accordance with the present invention.

FIG. 2 shows a cross-sectional view of a second embodiment, whereby the same reference numerals are used to denote the same or like parts. The first object 10 comprises on its surface in one area a plurality of depressions 47 which indicate the pattern 42. On a second area, the first object comprises a polymer film 52 on its surface. The first object 10 further comprises a piezoelectric portion 35 for the activation of movement of the first object 10, as indicated by the arrow. Contacts are not shown for simplicity reasons. The activation of the movement can also be provided by other techniques, for example by thermal, electromagnetic, or capacitance actuation.

A track cantilever 45 as part of the tracking means 40 is arranged at the second object 20. This track cantilever 45 reaches until the surface of the second object 20 and detects the depressions 47. The track cantilever 45 may also form the depressions 47 into the surface of the first object 10. This has the advantage that the pattern 42 can be defined individually for a particular application.

A plurality of thermal cantilevers 54 are arranged on the second object 20. The thermal cantilevers 54 are positioned between the first and second object 10, 20 such that the tips of the thermal cantilevers 54 reach to and into the polymer film 52. The polymer film 52 and the plurality of thermal cantilevers 54 form the releasable clamping means 50. For the releasable clamping, i.e. for gluing and ungluing, the thermal cantilevers 54 have integrated heaters which heat the tips of the thermal cantilevers 54 for a short period of time by applying a current to the heaters. At a position where a heated tip is touching the polymer film 52, the polymer film 52 melts, the tip enters into the polymer film 52 and sticks on it. By using a plurality of thermal cantilevers 54 the first object 10 is clamped to the second object 20 such that the scanning apparatus can have every angular position. That means, in the clamped position the scanning apparatus might be vertical or even upset down. The tips of the thermal cantilevers 54 are released by a repeated heating or by applying a force. The force might be provided externally and lead to a pull off of the tips form the polymer film 52. The process of gluing and ungluing can be repeated arbitrarily.

Figure 3:
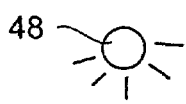
FIG. 3 is a schematic illustration of a third embodiment of a scanner constructed in accordance with the present invention.

FIG. 3 shows a schematic illustration of a third embodiment. The same reference numerals are used to denote the same or like parts. This embodiment differs from that of FIG. 1 in that the first object 10 and the lever 12 are transparent. A light source 48 is positioned above the second object 20. On the other hand, a corresponding photo-sensor 49 is positioned on the first object 10. The pattern 42 on the first and second object 10, 20 are arranged between the light source 48 and the photo-sensor 49 such that a precise detection of the relative movement is achievable. The two pattern 42 with nano-meter periodicity are used as position sensor. Many possibilities are known how a signal is obtained that depends on whether the patterns 42 are aligned in phase or out of phase. Measuring optical transmission or reflection, the change of an interference pattern, or the capacitance are such examples. When such a signal reaches a predefined value further movement of the first object 10 or the second object 20 is prevented by a feedback onto the actuation of the moving means 30 (not shown).

The present invention has many advantages. The scanner has nearly zero power consumption for holding a position with nano-meter precision. No energy is wasted when the scanner is not in use. Furthermore, the scanner has very high stability, integrated tracking, and can be produced with a small form factor. In one aspect of the present invention, the patterns on the first and second object have substantially the same orientation which is predefined. Thus, a precise alignment can be achieved. The movement of the scanner can be fast enough to allow for scanning. Moreover, when the pattern is periodic, than the scanner can be fabricated by batch fabrication.

If a tracking means is arranged in each moving direction, than the advantage occurs that the scanning can be performed in every direction. When the pattern comprises a plurality of depressions and the tracking means comprise further a track cantilever for tracking these plurality of depressions, than it proves advantageous that a precise scanning along a defined direction can be achieved. It is an advantage if the pattern comprises the releasable clamping means, because than no additional space is required for arranging this clamping means. The tracking means may comprise optical detection means, e.g. a light source and a photo-sensor provided that one object or a lever is transparent. This allows a precise control of the movement. A simple clamping is achieved when the releasable clamping means comprises a capacitance means, a magnetic means, or an electrostatic means. The advantage of these mechanisms is a fast clamping and releasing. The releasable clamping can also be achieved by thermal gluing and ungluing means, which shows the advantage of a strong fixing.

The driving of one of the first and second object is provided by the moving means which comprises a piezoelectric means or a thermal cantilever having a thermal means for expansion and contraction. Using this techniques, a movement with defined equidistant steps can be achieved. The moving means might be not only internally but also externally arranged. For example, a drive that is externally mounted for moving one of the first and second objects can be replaced by another if the drive is out of order. When the moving means comprises a feedback mechanism or a loop control, then the advantage occurs that the scanner can be operated in a defined "hard" mode.

Any disclosed embodiment may be combined with one or several of the other embodiments shown and/or described. This is also possible for one or more features of the embodiments. Moreover, while the invention has been shown or described in only some of its forms, it should be apparent to those skilled in the art that it is not so limited, but is susceptible to various changes without departing from the scope of the invention.

What is claimed is:

1. A scanning apparatus for moving a first object relative to a second object, said apparatus comprising:
   moving means to move at least one of said first and second objects;
   tracking means coupled to said moving means, comprising
      a first plurality of pattern elements arranged according to a pattern on said first object,
      a second plurally of pattern elements arranged according to said pattern on said second object, and
      means for determining a position of said first object and said second object relative to one another utilizing said first plurality of pattern elements; and
   releasable clamping means to releasably hold each of said first object and said second object in response to a determination of said position of said first object and said second object relative to one another.

2. The scanning apparatus of claim 1 wherein each of said first plurality of pattern elements and said second plurality of pattern elements has substantially to same orientation.

3. The scanning apparatus of claim 1 wherein the pattern is periodic.

4. The scanning apparatus of claim 1, wherein
   said tracking means comprises a first tracking means oriented along a first axis, and
   said scanning apparatus further comprises a second tracking means oriented along a second axis.

5. The scanning apparatus of claim 1 wherein
   said releasable clamping means comprises said first plurality of pattern elements, and
   said first plurality of pattern elements are utilized to releasably hold said each of said first object and said second object.

6. The scanning apparatus of claim 1 wherein said tracking means comprises optical detection means.

7. The scanning apparatus of claim 1 wherein said releasable clamping means comprises at least one of:
   a capacitance clamping means, an electromagnetic clamping means, an electrostatic clamping means, and a thermal gluing means.

8. The scanning apparatus of claim 1 wherein said moving means comprises at least one of:
   a thermal cantilever having a thermal means for expansion and contraction, a piezoelectric moving means, and an externally mounted drive.

9. The scanning apparatus of claim 1, wherein
   said tracking means comprises means for generating a feedback signal in response to a determination of said position of said first object and said second object relative to one another, and
   said moving means utilizes said feedback signal to control movement of said at least one of said first and second objects.

10. The scanning apparatus of claim 1, wherein at least one of said first object and said second object comprises a micromechanical device.

11. The scanning apparatus of claim 1, wherein said first plurality of pattern elements comprises a plurality of conducting lines.

12. The scanning apparatus of claim 1, wherein said tracking means further comprises means for dynamically generating said pattern.

13. A method of moving a first object relative to a second object, said method comprising:
   moving at least one of said first and second objects;
   tracking said at least one of said first and second objects, wherein
      said second object comprises a first plurality of pattern elements arranged according to a pattern,
      said second object comprises a second plurality of pattern elements arranged according to said pattern, and
      said tracking comprises
         determining a position of said first object and said second object relative to one another utilizing said first plurality of pattern elements; and releasably clamping said first object and said second object in response to a determination of said position of said first object and said second object relative to one another.

14. A scanning apparatus for moving a first abject relative to a second object, said apparatus comprising:
- moving means far driving one of the first and second objects;
- tracking means comprising a plurality of pattern elements arranged according to a pattern on said first object, and
- releasable clamping means for holding said first and second object in a position defined by said pattern, wherein
- said plurality of pattern elements comprise a plurality of depressions, and
- said tracking means further comprises a track cantilever for tracking said plurality of depressions.

* * * * *